Patented Oct. 29, 1935

2,019,453

UNITED STATES PATENT OFFICE 2,019,453

RESINOUS MATERIALS AND PROCESSES FOR PRODUCING THEM

Arthur M. Howald, Pittsburgh, Pa., assignor to Toledo Synthetic Products, Inc., Toledo, Ohio, a corporation of Ohio No Drawing. Application February 11, 1929, Serial No. 339,225

31 Claims. (Cl. 260—3)

This invention relates to the manufacture of formaldehyde-urea resins and it comprises a process of making materials of a glassy character wherein an initial condensation product of formaldehyde and a urea is first formed, and then more urea is added and combined to give condensation products having certain ratios of formaldehyde to urea, the said condensations being effected in such a way that the condensation products may be isolated in a substantially dry state with the reactions arrested at a point where sufficient fusibility exists to enable easy molding and hardening under heat; and it further comprises the products thus obtained, the said products being of resinous character and capable under heat and pressure of being converted into stable, clear, glassy infusible resins; all as more fully hereinafter set forth and as claimed.

One of the principal objects of the invention is the provision of a simple, economical and certain method for the production of glassy resins consisting largely of condensation products of urea with aldehydes, such resins to be highly resistant to shock and to water and other common solvents, practically unaffected by light and capable of withstanding, without decomposition, warping, checking or other damage, prolonged exposure to temperatures that have heretofore been found to be damaging.

Another object is the provision of a molded resin of this type having brilliance and transparency in high degree.

Another object is the production of condensation products of this type which are capable of being molded to form such molded resins at temperatures higher than have heretofore been practicable.

Another object is reduction of the time that said products must remain in the mold to acquire permanent shape.

And still another object is the utilization as a plasticizer of a substance having properties which make it capable of also performing the function of a hardener for aldehyde-urea resins.

An ancillary object is ease of hydrogen ion concentration control during combination, condensation, drying and molding.

And another ancillary object is the production of a resin having a relatively complete combination of constituents and practical absence of uncombined residues.

As is well known, hard glassy articles can be made with the aid of urea and formaldehyde, but most of the proposed methods of manufacture fail to give consistent and regular results. This I attribute mainly to lack of attention to detail and to a lack of recognition of necessary conditions. In the preliminary stages of operation it is necessary to have a rather large proportion of formaldehyde present; the molecular ratio between formaldehyde and urea being 2:1 or even 2.5:1. And alkalinity, or at least non-acidity is desirable in the mixture at this time. A glassy final product of satisfactory quality should however have a composition representing a ratio of approximately 1.75:1 or somewhere between 2:1 and 1.5:1; should be free of formaldehyde or urea existing as such and should be of distinctly acid nature. The formaldehyde added at the start of the process, above the final composition of approximately 1.75:1 represents an excess which must be eliminated in the subsequent steps of the process.

In the present invention, I provide a way of operating in which the aldehyde ratio can be progressively and safely lowered during the operation and the pH value kept under optimum conditions at all times. By the use of a certain type of plasticizer, I can facilitate molding and also cause a development of acidity when acidity is wanted; at the time of hardening. The plasticizer also increases the resistance to shock of the final molded article.

Operating in the manner stated, I am enabled to make a hard, durable and permanent article; a glassy resinous body of superior characteristics.

In practicing the invention I first combine urea and an aqueous solution of formaldehyde in the presence of an excess of formaldehyde, which is accomplished without causing cloudiness or opacity. After the initial combination of urea and formaldehyde has taken place I then combine a part of the remaining formaldehyde with more urea, but again leave an excess of uncombined formaldehyde. The final residue of uncombined formaldehyde I combine with still more urea. It is possible to combine successive residues of formaldehyde by the addition of urea in properly diminishing quantities without causing cloudiness, and by the use of appropriate non-aqueous solvents in the last stages cloudiness may be avoided entirely.

I have also incorporated in my process steps of controlling the hydrogen ion concentration which are important to its success and which are effective notwithstanding variations in constituents and conditions which might otherwise cause failure. This hydrogen ion concentration control is accomplished by means of a strong organic base which does not combine or react with formaldehyde. The process is started with the pH value low, to initially accelerate reaction, and the pH value is raised during subsequent stages to hold the reaction in control. I employ an organic base having sufficient buffer action to obviate the necessity for extreme care and accuracy in its use; triethanolamine being such a base.

In reducing my invention to practice the following processes are preferred:

*Example 1:*—Approximately 2 to 2.2 mols of formaldehyde in 30 to 40 per cent aqueous solution is brought to a slightly acid condition with a pH value of from 5 to 6. One mol of urea is added and the mixture is boiled until combination of urea and formaldehyde is effected and an initial condensation product is produced. Then more urea is added to the mixture in quantities sufficient to bring the ratio of mols of formaldehyde to mols of urea to approximately 1.75:1. The hydrogen ion concentration of the solution so obtained is adjusted to a pH value between 7 and 8. The alkaline solution is then evaporated to a syrup. The syrup is diluted or thinned with an alcohol having a medium boiling point and the diluted syrup boiled to remove water. Then there is added further urea in amount sufficient to combine with the remaining formaldehyde, that is, an amount sufficient to lower the ratio of mols of formaldehyde to mols of urea. The final ratio may be as low as 1.5:1. The syrup thus obtained is mixed with sufficient amount of a polybasic acid-polyhydric alcohol condensation product having uncombined or free acid groups to reduce the hydrogen ion concentration to a value between 3.5 and 5. The mixture thus obtained is dried to remove water and alcohol and then the solid mass thus obtained is pulverized to convert it into a molding powder. The molding powder thus obtained may be molded under heat and pressure to give molded articles. Heat and pressure may be maintained for from 1 to 20 minutes. The molding under heat and pressure may be for a time only sufficient to enable the molded product to retain its shape during removal from the mold, and there may be a final curing of the molded product by means of heat without pressure.

*Example 2:*—Approximately 2 to 2.2 mols formaldehyde in 30 to 40 per cent aqueous solution are brought to a but slightly acid condition with a pH value of from 5 to 6, preferably about 5.5, by the addition of triethanolamine. One mol of urea is added and the mixture is boiled very gently until combination of the urea and formaldehyde and initial condensation have taken place. By further addition of triethanolamine the pH value is then brought to between 7 and 8 (preferably about 7.5) and the solution is evaporated to a very thick syrup containing less than 10 per cent of water. A liquid of alcoholic nature is then added (preferably a solvent containing at least one hydroxyl group, such as butyl alcohol or the monomethyl ether of ethylene glycol), the solution is heated to boiling and additional urea added in small portions to combine with remaining free formaldehyde. Boiling in the presence of the non-aqueous solvent further reduces the proportion of water. The final composition should represent a ratio of mols of formaldehyde to mols of urea less than 2:1 and it may be as low as 1.5:1. The molecular weight of formaldehyde (30) being half that of urea (60), a molecular ratio of 2:1 corresponds to 1:1 ratio by weight, while 1.5:1 in molecules corresponds to a weight ratio of formaldehyde to urea of 3:4.

The syrup is then mixed at a temperature below 80° centigrade with the condensation product of polybasic acid with polyhydric alcohol, which product may be conveniently added in the form of its 80 per cent solution in alcohol. Sufficient of this polybasic acid-polyhydric alcohol condensation product is added to reduce the pH value to between 3.5 and 5. The mixture is then dried in vacuum at a temperature of about 40 to 60° centigrade until it can be ground, and after grinding it is dried further, at the same temperature, to remove traces of solvent and water.

The material at this stage may be regarded as in a reaction arrested state or as representing an arrested reaction. It is sufficiently fusible to enable free flow under ordinary molding pressures before setting while setting develops at the molding temperature. The pulveriform condensation product is made by a process easily controlled and a satisfactory uniform product can be consistently obtained in the described process. In the present process an initial condensation product of formaldehyde and urea is first formed and then more urea is added and combined to give the desired final ratio of formaldehyde to urea. The condensations are effected in such a way that they are easily controlled and the product can be isolated as a clear, dry, resin sufficiently fusible to flow in the mold.

The process is controlled by adjusting the hydrogen ion concentration, that is the pH value of the reaction mixtures in a certain fundamental manner in the various steps of the process. In certain stages the reaction solutions are slightly acid and in others they are alkaline. Also volatile organic solvents are used in controlling the process at certain stages. These organic solvents assist in preventing development of cloudiness or opacity and facilitate removal of the water in drying. They also have other advantages.

The resulting molding powder may be molded under pressure at temperatures of 120 to 150° centigrade and the molded article may be removed from the mold in from one to twenty minutes, depending upon its size and upon other conditions. Fnal curing is then effected by heating in an oven without pressure at from 80 to 140° centigrade for periods varying with various articles.

Coloring matter, either in the form of relatively non-soluble pigment or soluble dye, may be added during the syrupy stage or to the dry powder. Part of the urea in the above process may be replaced with the thiourea.

Articles made according to the above described process are hard and tough. They are practically unaffected by water and other common solvents and by ultra-violet and visible light, and they are capable of withstanding without damage prolonged exposure to relatively high temperatures.

The above description of my invention is to be regarded as illustrative only, and it is to be understood that the invention is susceptible to variation within the spirit and scope of the subjoined claims, in which the terms urea, aldehyde, formaldehyde and triethanolamine include equivalent substances.

I claim:—

1. In the production of useful products by the reaction of urea on formaldehyde in aqueous solution, the process which comprises forming an initial product by heating urea with an excess of formaldehyde in a slightly acid solution, making the solution slightly alkaline, adding additional urea and concentrating the solution by evaporation.

2. In the production of useful products by the reaction of urea on formaldehyde in aqueous solution, the process which comprises forming an initial product by heating urea with an excess of formaldehyde in a slightly acid solution, making the solution slightly alkaline, adding additional urea, concentrating the solution, making the solution slightly acid and again concentrating.

3. In the production of useful products by the reaction of urea on formaldehyde in aqueous solution, the process which comprises forming an initial product by heating urea with formaldehyde solution at a pH of from 5 to 6, raising the pH from 7 to 8, adding additional urea and concentrating the solution.

4. In the production of useful products by the reaction of urea on formaldehyde in aqueous solution, the process which comprises forming an initial product by heating urea with an excess of formaldehyde in a slightly acid solution, making the solution slightly alkaline, adding additional urea, concentrating the solution, adding a polybasic acid-polyhydric alcohol condensation product and again concentrating.

5. In the production of useful products by the reaction of urea on formaldehyde in aqueous solution, the process which comprises forming an initial product from urea and formaldehyde in aqueous solution, concentrating the solution, adding alcohol and additional urea, and again concentrating.

6. In the production of useful products by the reaction of urea on formaldehyde in aqueous solution, the process which comprises forming an initial product from urea and formaldehyde in aqueous solution, concentrating the solution, adding a polybasic acid-polyhydric alcohol condensation product and additional urea, and again concentrating.

7. In the production of useful products by the reaction of urea on formaldehyde in aqueous solution, the process which comprises forming an initial condensation product of formaldehyde and urea in aqueous solution, concentrating the solution, adding a polybasic acid-polyhydric alcohol condensation product, and again concentrating.

8. In the production of useful products from urea and formaldehyde by reacting urea and formaldehyde in aqueous solution, the process which comprises regulating the acidity of said solution by the addition of triethanolamine.

9. In the production of useful products from urea and aqueous formaldehyde by reacting urea and formaldehyde in aqueous solution, the process which comprises adding urea to the solution after an initial reaction at boiling temperatures and regulating the acidity by the addition of triethanolamine.

10. In the production of useful products from urea and formaldehyde suitable for making molded products, the process which comprises forming an initial product by heating urea with an excess of formaldehyde in a slightly acid medium, making the medium slightly alkaline, adding additional urea, arresting action by reducing to dryness by evaporation, and pulverizing the residue.

11. In the production of useful products by the reaction of urea on formaldehyde in aqueous solution, the process which comprises adjusting the hydrogen ion concentration of a 30 to 40 per cent aqueous solution of formaldehyde to a pH value of from 5 to 6 by adding triethanolamine, adding one mol urea for each 2.2 mols of formaldehyde, boiling the mixture until combination of the urea and formaldehyde and initial condensation has taken place, adding urea in amount sufficient to bring the ratio of mols of formaldehyde to mols of urea to approximately 1.75:1, adjusting the pH value to between 7 and 8 by adding triethanolamine, again adding urea and concentrating the resulting mixture by evaporation.

12. In the production of useful products by the reaction of urea on formaldehyde in aqueous solution, the process which comprises forming an initial product by heating urea with an excess of formaldehyde in a slightly acid solution, making the solution slightly alkaline, concentrating the alkaline solution thus obtained to a syrup, adding additional urea and concentrating the solution by evaporation.

13. In the production of useful products by the reaction of urea on formaldehyde in aqueous solution, the process which comprises forming an initial condensation product by heating urea with an excess of formaldehyde in a slightly acid solution, making the solution slightly alkaline, evaporating the alkaline solution thus obtained to a very thick syrup containing less than 10 per cent of water, mixing the thick syrup with a medium boiling organic solvent, boiling the mixture thus obtained and adding additional urea, the amount of said additional urea being sufficient to bring the ratio of mols of formaldehyde to mols of urea to between 2:1 and 1.5:1, mixing the syrup thus obtained at below 80° C. with the condensation product of a polybasic acid with a polyhydric alcohol, and then drying the mixture thus obtained in a vacuum at a temperature of about 40° to 60° C. until a solid which is capable of being ground is obtained, and grinding the solid thus obtained to a powder.

14. The process of claim 13 in which the said powder is further dried at a temperature between 40° and 60° C. to remove residual traces of solvent and water.

15. As a new product, a pulverulent molding preparation in a reaction-arrested state, comprising a urea-formaldehyde condensation product and a polybasic acid-polyhydric alcohol condensation product.

16. A rapid-hardening resinous polyhydric alcohol-polybasic acid-urea-formaldehyde condensation product such as can be obtained by condensation in an alcoholic solvent for the polyhydric alcohol polybasic acid resin.

17. In the process of making rapid-hardening resinous compositions, the step which comprises bringing together in a heated condition, a resin of the polyhydric alcohol polybasic acid type and a urea-aldehyde condensation product in the presence of an alcoholic solvent for the polyhydric alcohol polybasic acid resin.

18. In the process of making rapid-hardening resinous compositions, the step which comprises forming a solution of a resin of the polyhydric alcohol polybasic acid type and a urea-formaldehyde condensation product in an alcoholic solvent for the polyhydric alcohol polybasic acid resin.

19. As a new product, a solution of a resinous complex comprising a resin of the polyhydric alcohol polybasic acid type and a urea-formaldehyde condensation product in an alcoholic solvent for the polyhydric alcohol polybasic acid resin.

20. The process of claim 17, wherein the said solvent is subsequently removed to recover a dry solid complex resin.

21. A method of producing a polybasic acid-polyhydric alcohol modified urea-formaldehyde condensation product, consisting in adding to the condensation product derived from urea and formaldehyde, a polybasic acid-polyhydric alcohol product, and then heating the mixture to condense the ingredients.

22. A method of producing a polybasic acid-polyhydric alcohol modified urea-formaldehyde condensation product, consisting in performing condensation of the urea and formaldehyde in a non-neutral solution, and adding a polybasic acid-polyhydric alcohol product, and then heating the mixture to further condense the ingredients.

23. In the manufacture of modified urea-formaldehyde condensation products, the steps which comprise mixing a polybasic acid-polyhydric alcohol product with a product derived from urea and formaldehyde and subjecting the mixture to temperatures sufficient to condense the ingredients.

24. In the manufacture of modified urea-formaldehyde condensation products, the improvement which comprises condensing a reaction product of urea and an aldehyde, in the presence of a polyhydric acid-polybasic alcohol product, to form said modified products.

25. In the manufacture of modified urea-formaldehyde condensation products, the steps which comprise forming a non-acid solution of urea-formaldehyde reaction products, adding a polybasic acid-polyhydric alcohol product and subjecting the urea-formaldehyde product, in the presence of the polybasic acid-polyhydric alcohol product, to a temperature sufficient to condense the ingredients, the urea-formaldehyde reaction products being slightly acidified prior to said condensing of the ingredients.

26. In the manufacture of urea-formaldehyde molding powders, the steps which comprise preparing a solution in a volatile solvent of a urea-formaldehyde reaction product having formaldehyde combined with urea in the molar ratio of approximately 1.5:1, adjusting the acidity of said solution to between pH 3.5 and 5, removing the solvent from the said slightly acid solution by evaporation at a low temperature until a dry solid condensation product capable of being ground to a powder is obtained and grinding said dry product to a powder.

27. The process of claim 26 wherein said drying is effected at temperatures between 40 and 60° C.

28. The process of claim 26 wherein said dry product is hot pressed at temperatures between 120° and 150° C. to shape and then harden the urea-formaldehyde product into infusible, shaped molded products.

29. The process of claim 26, wherein during the preparation of said solution the acidity thereof does not exceed a pH corresponding to 5.5.

30. In the manufacture of urea-formaldehyde molding powders, the steps which comprise adjusting the acidity of a solution in volatile solvent of urea-formaldehyde reaction products to between a pH of 3.5 and 5, just prior to drying, and then drying the solution of limited acidity so obtained at low temperatures to obtain a dry, fusible product.

31. The process of claim 30 wherein said adjustment of the acidity is effected at a temperature below 80° C. and said drying is effected at between 40 and 60° C.

ARTHUR M. HOWALD.